United States Patent
Decker

(10) Patent No.: US 9,422,201 B2
(45) Date of Patent: Aug. 23, 2016

(54) REFRACTORY COMPOSITION AND PROCESS FOR FORMING ARTICLE THEREFROM

(71) Applicant: Stellar Materials Incorporated, Boca Raton, FL (US)

(72) Inventor: Jens Decker, Ann Arbor, MI (US)

(73) Assignee: Stellar Materials Incorporated, Boca Raton, FL (US)

( * ) Notice: Subject to any disclaimer, the term of this patent is extended or adjusted under 35 U.S.C. 154(b) by 0 days.

(21) Appl. No.: 14/421,477

(22) PCT Filed: Aug. 20, 2013

(86) PCT No.: PCT/US2013/055673
§ 371 (c)(1),
(2) Date: Feb. 13, 2015

(87) PCT Pub. No.: WO2014/031574
PCT Pub. Date: Feb. 27, 2014

(65) Prior Publication Data
US 2015/0197450 A1   Jul. 16, 2015

Related U.S. Application Data

(60) Provisional application No. 61/691,411, filed on Aug. 21, 2012.

(51) Int. Cl.
| | |
|---|---|
| *C04B 28/34* | (2006.01) |
| *C04B 35/63* | (2006.01) |
| *C04B 35/66* | (2006.01) |
| *C04B 35/101* | (2006.01) |
| *C04B 35/14* | (2006.01) |
| *C04B 35/185* | (2006.01) |
| *C04B 35/565* | (2006.01) |
| *C04B 35/76* | (2006.01) |
| *C04B 35/80* | (2006.01) |
| *C04B 35/10* | (2006.01) |
| *C04B 35/626* | (2006.01) |
| *C04B 35/64* | (2006.01) |
| *C01B 25/44* | (2006.01) |
| *C04B 111/28* | (2006.01) |

(52) U.S. Cl.
CPC ........... *C04B 35/6309* (2013.01); *C01B 25/44* (2013.01); *C04B 28/34* (2013.01); *C04B 35/10* (2013.01); *C04B 35/101* (2013.01); *C04B 35/14* (2013.01); *C04B 35/185* (2013.01); *C04B 35/565* (2013.01); *C04B 35/62675* (2013.01); *C04B 35/6306* (2013.01); *C04B 35/64* (2013.01); *C04B 35/66* (2013.01); *C04B 35/76* (2013.01); *C04B 35/80* (2013.01); *C04B 2111/28* (2013.01); *C04B 2235/3217* (2013.01); *C04B 2235/3241* (2013.01); *C04B 2235/3418* (2013.01); *C04B 2235/3427* (2013.01); *C04B 2235/447* (2013.01); *C04B 2235/6027* (2013.01); *C04B 2235/72* (2013.01); *C04B 2235/77* (2013.01); *Y02W 30/94* (2015.05)

(58) Field of Classification Search
CPC .............. C04B 28/34; C04B 35/6306; C04B 35/6309; B22C 1/185
See application file for complete search history.

(56) References Cited

U.S. PATENT DOCUMENTS

| | | | | |
|---|---|---|---|---|
| 1,975,080 | A * | 10/1934 | Boughton | ................ H01B 3/04 156/196 |
| 4,039,344 | A | 8/1977 | Nishikawa et al. | |
| 4,127,157 | A * | 11/1978 | Gardikes | ............. C04B 35/6309 106/38.3 |
| 4,366,255 | A | 12/1982 | Lankard | |
| 6,815,386 | B1 | 11/2004 | Kwong et al. | |
| 8,105,683 | B2 | 1/2012 | Thompson et al. | |
| 2008/0261837 | A1* | 10/2008 | Usova | ...................... C09K 8/80 507/264 |

FOREIGN PATENT DOCUMENTS

| | | |
|---|---|---|
| GB | 2177081 | 1/1987 |
| JP | H03215366 A | 9/1991 |
| RU | 2015948 C1 | 7/1994 |
| WO | WO-2011119598 | 9/2011 |

OTHER PUBLICATIONS

Kliment'eva et al. A Study of the Aluminum-Chromium Phosphate Binder Based on the Slurry (Slime) Orthophosphoric Acid. V. A. Kucherenko Central Scientific-Research Institute TsNIISK. Translated from Ogneupory, No. 8, pp. 26-31, Aug. 1986.*
Dogan, P. et al., "Improved Refractories for Slagging Gasifiers in IGCC Power Systems," 2003, Conference: 17th Annual Conference on Fossil Energy Materials, Baltimore, MD Apr. 22-24, 2003, sponsored by USDOE Office of Fossil Energy (FE)(US).
Zapffe, C.A., "Conversion of Certain Refractory Oxides to a Suboxide Form at High Temperatures," 1944, vol. 27, Issue 10, Presented at the Forty-Sixth Annual Meeting, The American Ceramic Society, Pittsburgh, PA, pp. 293-298.
Biedenkopf, P. et al., "Vaporization and Corrosion of Refractories in the Presence of Pressurized Pulverized Coal Combustion Slag," J. Am. Ceram. Soc., 84(7) 1445-1452 (2001).
International Search Report and Written Opinion for co-pending international application No. PCT/US2013/055673, issued Dec. 5, 2013.

(Continued)

*Primary Examiner* — Noah Wiese
(74) *Attorney, Agent, or Firm* — Dinsmore & Shohl LLP; Weston R. Gould

(57) ABSTRACT

Refractory compositions and methods of forming articles therefrom are provided that include a plurality of aggregate particles and a binder intermixed with the aggregate particles. The binder composition includes sintered crystalline chromium metaphosphate or chromium-aluminum metaphosphate, or combinations of the two distributed in the binder. The provided compositions are free of chromium oxide yet exhibit excellent slag resistance and are easily disposed of.

18 Claims, No Drawings

(56) References Cited

OTHER PUBLICATIONS

Kliment'Eva et al., "A Study of the Aluminum-Chromium Phosphate Binder Based on the Slurry (Slime) Orthophosphoric Acid," Refractories and Industrial Ceramics, vol. 27, No. 7, Jun. 1986, pp. 459-465.

Hye-Jung Han et al., "Studies on Curing Chemistry of Aluminum-Chromium-Phosphates as Low Temperature Curable Binders", Journal of Sol-Gel Science and Technology, Jan. 2003, pp. 223-228.

Angolenko et al., "Oxidation resistance before and after heat treatment for compacted $Al_2O_3$-SiC-C mixtures with aluminum-chromium-phosphate binder", Refractories and Industrial Ceramics, vol. 50, No. 1, Jan. 2009, pp. 52-56.

* cited by examiner

US 9,422,201 B2

REFRACTORY COMPOSITION AND PROCESS FOR FORMING ARTICLE THEREFROM

CROSS REFERENCE TO RELATED APPLICATIONS

This application depends from and claims priority to U.S. Provisional Application No. 61/691,411 filed Aug. 21, 2012, the entire contents of which are incorporated herein by reference.

FIELD OF THE INVENTION

The present invention in general relates to a slag resistant refractory composition and process for forming an article therefrom, and in particular a composition having crystalline chromium metaphosphate used or formed in the composition binder alone or with other components to produce an article with exceptional refractory corrosion resistance.

BACKGROUND OF THE INVENTION

The use of refractory high fired bricks with high purity and chromium oxide contents of up to 90% and even higher are currently used when attempting to reduce corrosion in highly corrosive environments such as basalt glass tanks, black liquor application in the paper and pulp industry, coal gasification, cleaning slags in stainless steel manufacturing, and chemical waste incineration. Ordinary chromium oxide $Cr_2O_3$ can form $CrO_3$ during oxidation in a furnace environment. $CrO_3$ is water soluble and highly carcinogenic. Refractory bricks incorporating chromium oxide materials, therefore, suffer from a significant disadvantage in that the disposal of used chromium containing refractory linings can require special precautions with regards to health and safety of the construction crews and contamination of waste deposits due to the potential of water soluble $CrO_3$ byproducts.

Thus, there exists a need for a refractory composition with improved corrosion resistance and superior handling properties without the need for included chromium oxide. There also exists a need for refractory articles formed from such a composition that have an extended operational lifetime relative to conventional refractory articles.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Refractory compositions are provided with excellent corrosion resistance and superior handling properties without inclusion of elements that may be or form chromium oxide ($CrO_3$) when in use. A refractory composition includes a plurality of aggregate particles and a binder intermixed with the plurality of aggregate particles, where the binder includes crystalline chromium metaphosphate, or chromium-aluminum metaphosphate, or both, distributed in the binder. In some embodiments, chromium oxide is not present in the material, nor will chromium oxide be formed from the elements of the composition when in use such as during exposure to high temperatures. The metaphosphate may be in the form of neutral dry particles. In some embodiments, the aggregate is alumina, silicon carbide, fumed silica, or mullite.

Also provided are processes of forming a refractory article. A process includes forming a binder mixture of a chromium metaphosphate, chromium-aluminum metaphosphate, or both, and mixing the binder with an aggregate. The resulting refractory article is free of chromium oxide. In some embodiments, the aggregate is alumina, silicon carbide, fumed silica, or mullite. An additive is optionally added to the mixture where the additive is optionally calcium aluminate cement, sodium silicate, or polyphosphate.

A process optionally further includes forming a shaped refractory article. A shaped refractory article is optionally formed by pouring the binder and aggregate mixture into a mold, optionally a plaster mold, having a shape complementary to the article and allowing the mixture to dry to form a piece of greenware. Sintering is optionally used. A support material, optionally steel fibers, is optionally embedded in the mixture. The process provides a superior slag resistant article that can be used in highly corrosive environments without the production of carcinogenic chromium oxide.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or materials are described as an order of individual steps or using specific components, it is appreciated that described steps or components may be interchangeable such that the description of the invention includes multiple parts or steps arranged in many ways as is readily appreciated by one of skill in the art.

A refractory binder composition is provided for the production of refractory articles with improved slag resistance in the absence of chromium oxide(s). As such, a slag resistant article is provided or can be manufactured using a refractory binder composition that does not produce the water soluble and highly carcinogenic $CrO_3$ during heating.

The present invention has utility as a refractory composition that may further include or be associated with a variety of aggregate particles, fibers, fillers, or combinations thereof joined by the refractory binder containing sintered crystalline chromium metaphosphate, e.g. $CrP_3O_9$, or chromium-aluminum metaphosphate. According to some embodiments, a kit is provided to produce a refractory binder or article. A kit includes chromium metaphosphate, chromium-aluminum metaphosphate, or combinations thereof, and an aggregate material, optionally along with instructions to mix the contents with an optional quantity of water and an optional reinforcing material and/or filler. The slag resistant refractory binder is amenable to incorporation of strengthening materials such as steel fibers and is operative with aggregate particulate illustratively including silicon carbide, mullite, alumina, titania, and combinations thereof. Through control of water content and one or more additives, the cast form of an article from an inventive composition has sufficient green strength to be handled for subsequent transportation, installation, and optionally machining prior to firing to provide a refractory article with superior slag resistance, strength, or alkali resistance as compared to conventional materials.

An inventive refractory composition includes a binder of chromium metaphosphate, chromium-aluminum metaphosphate, or both, that is mixed with a plurality of aggregate particles and optionally formed into green article or fired at a sintering temperature to form a hardened refractory composition wherein the metaphosphate(s) is distributed throughout the resulting composition. By distributed, it is meant that a substantially homogenous intermixing is achieved through mechanical mixing to blend the materials together followed by a sintering process. Chromium metaphosphate, chromium-aluminum metaphosphate, or both, as a binder is far less hygroscopic as compared to liquid chromium phosphates, and is more pH neutral.

Chromium metaphosphate as used in a refractory binder is a sintered composition of phosphate and chromium and has the formula $CrP_3O_9$. Chromium metaphosphate will provide a reactive phosphate compound for the formation of a refractory article and functions as a precursor for sinter activity at higher temperatures. Moreover, the chromium metaphosphate will provide desired slag resistance without forming carcinogenic $CrO_3$. Thus, the need for careful and expensive disposal requirements of prior art slag resistant refractory materials is avoided.

Sintered crystalline chromium metaphosphate is formed from any phosphate source. As opposed to high purity technical grades of phosphate typically used for production of aluminum phosphates, the sintered crystalline chromium metaphosphate can be manufactured from agriculture grade phosphoric acids with an advantage of lower production costs. Those phosphates provide improved strength and corrosion resistance in monolithic products. The sintered crystalline chromium metaphosphate is formed in some embodiments according to the following formula:

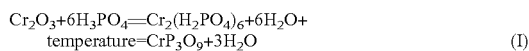

$$Cr_2O_3 + 6H_3PO_4 = Cr_2(H_2PO_4)_6 + 6H_2O + \text{temperature} = CrP_3O_9 + 3H_2O \qquad (I)$$

In an exemplary reaction, $CrO_3$ is combined with aqueous $H_3PO_4$ in a stoichiometric molar ratio of 1:3, respectively. The solution is dehydrated at a dehydration temperature of 300° C. until a dry substance is formed representing a chromium polyphosphate $(Cr_2(H_2PO_4)_6)$. The time for dehydration is dependent on the amount of material being dehydrated. The dry chromium polyphosphate is then crushed to less than 500 μm, and fired at 800° C. for two hours resulting in a chromium metaphosphate $(CrP_3O_9)$.

The chromium metaphosphate(s) are optionally combined with an aggregate of alumina, or with an alumina containing aggregate substance, and sintered in a firing process to form more stable phosphates of $CrAl_2(PO_4)_3$. As such, in some embodiments, a binder includes chromium-aluminum metaphosphate that when combined with an aggregate in a green article will be capable of forming a sintered refractory article with desired slag resistance without forming carcinogenic $CrO_3$.

The binder of the invention includes chromium metaphosphate, chromium-aluminum metaphosphate, or combinations thereof. As such the term "metaphosphate" when used herein absent a modifier is meant as chromium metaphosphate, chromium-aluminum metaphosphate, or combinations thereof.

The amount of metaphosphate binder present to form a matrix around refractory aggregate material depends on factors including size of the aggregate, desired interparticle separation, morphology, size of primary crystals and oxide state. Typically, metaphosphate binder is present between 2 and 20 total weight percent of the fully formulated refractory composition casting slurry, optionally 5 to 20 weight percent, optionally, 10 to 20 weight percent, optionally 15 weight percent. Preferably, alumina in an aggregate is present in excess molar stoichiometry relative to metaphosphate. Alumina or other aggregate is optionally present at 50 to 90 weight percent, optionally 60 to 80 weight percent, optionally 70 weight percent. It is appreciated that alumina is present as aggregate particles or alternatively is added as a minor quantity of the particles for reaction with the metaphosphate.

To facilitate mixing of aggregate and metaphosphate binder precursor, a quantity of water or organic solvent is optionally added to afford a slurry of a desired viscosity. Such organic solvents illustratively include alcohols, ketones, esters, ethers, amides, amines, glycols, alkanes, and the like. Optionally, such organic solvents are liquids below 200° Celsius, and preferably are liquids at 20° Celsius. Typical loadings of water or solvents range from 0-20 total weight percent, optionally 2-20 total weight percent, optionally 2-10 total weight percent, optionally 2-8 total weight percent, optionally 5 weight percent, of a fully formulated refractory composition slurry.

Optionally, one or more additives are included that are optionally of a type that will be consumed during firing of a green refractory composition. These additives are provided optionally to promote ease of handling. Such additives illustratively include: surfactants; polymerizable organic monomers or oligomers; deflocculants; polymers; and organic acids such as citric and oxalic. One may adjust slurry viscosity and green strength through the inclusion of such additives. In some embodiments, an additive, when present, is present from 0.01-5 total weight percent of a fully formulated refractory composition slurry. The inclusion of organic monomeric or oligomeric polymerizable materials upon cure can improve the green strength of the composition prior to firing. The polymer is decomposed when a green article is fired, and therefore is not present in the resultant refractory article. Examples of such organic polymers illustratively include acrylic acids, acrylates, polyethylene glycols, and polycarboxylate ethers, which are added as polymeric precursors or slurry soluble preformed polymers.

Handling properties of a refractory composition slurry and the green strength of a composition form after drying are also optionally modified through inclusion of one or more nonfacile additives. While the amount of such nonfacile additives is controlled by factors including desired green strength, identity of the refractory composition or components thereof, working environment, temperature and corrosivity, desired cold crush strength, and setting time, working time and curing time, typical loadings of such nonfacile additives range from 0.1 to 10 total weight percent of a fully formulated refractory composition slurry. Representative nonfacile additives include: calcium aluminate cement; sodium silicate; fumed silica; alkali metal or alkali earth polyphosphates; organic salts like citric, oxalic or nitric acids; calcium silicate cement; potassium silicate; and lithium silicate. Optionally, a nonfacile additive is present in a quantity such that the metaphosphate forms a continuous matrix phase with the nonfacile additive.

Aggregate embedded within a metaphosphate binder is limited only by the desired properties of the resultant refractory composition and compatibility with metaphosphate binder. An aggregate is optionally a ceramic particle. Ceramic particle aggregates illustratively include bauxite, alumina, mullite, silicon carbide, fused silica, rutile, andalusite, sillimanite, magnesite, forsterite, kyanite, and Mg spinell. It is appreciated that chromium oxide is not included in the refractory binder, refractory composition, or refractory article. Typical loadings of aggregate particles range from 50-95 weight percent of a fully formulated refractory composition slurry. Typical aggregate particle sizes range from 0.1 to 10000 microns. It is appreciated that the aggregate particles can be in a variety of forms including spherical, polyhedral, irregular, and combinations thereof.

A refractory composition or article optionally includes strengthening fibers such as steel fibers as detailed in U.S. Pat. No. 4,366,255. Illustrative examples of strengthening fibers include stainless steel fibers, steel, and other metal fibers. A pre-matted metal wool is optionally used as a strengthening fiber. In general, the metal fibers may range in length from about ¾ inch to 2.0 inches, have a diameter of from about 10 to 30 mils and possess an aspect ratio (length/diameter) greater than 50. Typical loadings of fibers are from 0 to 50 total weight percent of a refractory composition slurry. Other strengthening fiber fillers operative herein include carbon fibers with the recognition that firing occurs in a reducing atmosphere.

Also provided are processes of forming a refractory composition or refractory article. A process includes forming a metaphosphate binder and mixing the binder with an aggregate to form refractory composition that is free of chromium oxide. A binder mixture is optionally formed by heating a liquid precursor material of chromium polyphosphate or chromium-aluminum polyphosphate to a temperature sufficient to form insoluble material. Such a temperature is typically from 250° C. to 300° C. The resulting solid insoluble material is optionally placed in water alone or with alumina or alumina containing material and heated to a temperature sufficient to produce a chromium metaphosphate or chromium-aluminum metaphosphate, optionally a temperature of 500° C. to 1600° C., optionally 700° C. to 900° C., optionally 775° C. to 850° C., optionally 800° C. A resulting powder material is used as a component of a binder material.

The metaphosphate binder and aggregate is combined with a liquid such as water or organic solvent such as described above to form a slurry. A preferred amount of water is from 4% to 8% by weight, optionally 5% by weight, but higher or lower amounts such as described above may also be used. The resulting binder is then mixed with an aggregate or plurality of aggregates. The binder/aggregate mixture is optionally, but is not required to be, fired at 800° C. to 850° C., optionally 815° C. for 1-3 hours to form a green refractory composition with suitable handling properties to be machined and installed in a desired application or location. Subsequent firing can be performed in situ.

A process optionally includes adding at least one additive optionally of calcium aluminate cement, sodium silicate, or polyphosphate to the binder and aggregate mixture. An additive is optionally added in the range from 0.1 to 10 total weight percent of a fully formulated refractory composition slurry. Strengthening fibers or other additives may be further included in the mixture.

The refractory composition is optionally placed into a mold having a shape complementary to the desired refractory article, and the mixture allowed to dry to form a piece of greenware. The greenware is optionally heated to a sintering temperature either prior to placement in a site of use or sintered in situ. An advantage of the process is that the resulting greenware may be handled and installed prior to final sintering.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

Formation of Chromium-Aluminum Metaphosphate

A liquid chromium-aluminum phosphate (agricultural grade) is obtained from Innophos, Cranbury Township, N.J. The liquid chromium-aluminum phosphate is heated to a temperature of 260° C. for a sufficient amount of time to evaporate all the liquid and form a powder. For determination of the pH of the material, at least a portion of the resulting powder is crushed to a size of less than 500 μm, placed into water, and the pH determined by standard techniques. The resulting material has a pH of ~3.5. The powder sample is then fired at 800° C. for 2 hours to convert the polyphosphate to chromium-aluminum metaphosphate powder that is free of $CrO_3$. This powder is then crushed for subsequent use.

Example 2

Formation of Chromium Metaphosphate $CrO_3$ is combined with aqueous $H_3PO_4$ in a stoichiometric molar ratio of 1:3, respectively. The solution is dehydrated at a dehydration temperature of 300° C. until a dry substance is formed representing a chromium polyphosphate ($Cr_2(H_2PO_4)_6$). The time for dehydration is dependent on the amount of material being dehydrated. The dry chromium polyphosphate is then crushed to less than 500 μm, and fired at 800° C. for two hours resulting in a chromium metaphosphate ($CrP_3O_9$) that is free of $CrO_3$.

Example 3

Formation of a Metaphosphate Binder Composition

The chromium-aluminum metaphosphate of Example 1 (5% final wt) is mixed into bauxite aggregate along with 4.5 total weight percent water and 0.1% polyethylene glycol having a molecular weight of more than 300 grams per mole to form a slurry. Upon drying and firing at 800° C. for 5 hours, a ceramic is obtained having a crystalline chromium-aluminum metaphosphate continuous binder matrix phase.

In a second embodiment, a portion of the chromium metaphosphate of Example 2 is mixed (5% final wt) into bauxite aggregate along with 4.5 total weight percent water and 0.1% polyethylene glycol having a molecular weight of more than 300 grams per mole to form a slurry. Upon drying and firing at 800° C. for 5 hours, a ceramic is obtained having a crystalline chromium metaphosphate continuous binder matrix phase.

Example 4

The chromium-aluminum metaphosphate slurry of Example 3 is modified prior to firing to include 5% by slurry weight calcium aluminate cement. The resulting slurry is fired at 800° C. for 5 hours. A ceramic is obtained having a crystalline chromium-aluminum metaphosphate continuous binder matrix phase.

Example 5

The chromium metaphosphate slurry of Example 3 prior to firing is modified to include 5% by slurry weight calcium aluminate cement. The material is then fired for at 800° C. for 5 hours. A ceramic is obtained having a crystalline chromium metaphosphate continuous binder matrix phase.

Example 6

To the pre-fired slurry of Example 4 and separately to the pre-fired slurry of Example 5, dry sodium silicate is added to 0.015 total percent. Following firing at 800° C. for 5 hours, an increase in green strength is noted for both compositions. Reduced setting time is observed that facilitates ease of demolding and also produces a crystalline metaphosphate matrix phase.

Example 7

To the slurries of Example 3, 0.015 total weight percent dry sodium silicate is added to achieve an increase in green strength without resort to the calcium aluminate cement per Example 5. A formulation is made containing 88 total slurry weight percent bauxite, 0.015% dry sodium silicate, 5% chromium metaphosphate or chromium-aluminum metaphosphate binder, 0.1% polyethylene glycol, and the remainder water. After firing at 1500° C., cold crush strength of 22,000 psi is obtained.

To determine the permanent linear change and the resultant refractory material, the slurry is fired at temperatures of 1100° Celsius, 1370° Celsius, and 1600° Celsius. The chromium metaphosphate system and chromium-aluminum metaphosphate are not expected to create a significant melt phase.

Examples 8-32

Slurries are formulated according to Table 1 along with 0.15% dry sodium silicate. Resulting slurries are expected to be self-flowing and upon firing at 815° Celsius afford the cold crush strengths of between 50 and 220 N/mm$^2$ measured at 800° C.

Table 1. Amounts are expressed in weight percent of the slurry, with the exception of wt. % alumina as a weight percent of the base aggregate and any added calcined alumina; expected cold crush strength (C.C.S) is expressed in N/mm$^2$

TABLE 1

Exemplary formulations

| Example | Aggregate | Active | Fumed Silica | CaO Al$_2$O$_3$ Cement | Metaphosphate[1] | Calcined Alumina | H$_2$O | Sodium Silicate | PEG | Expected C.C.S (800° C.) |
|---|---|---|---|---|---|---|---|---|---|---|
| 8 | Bauxite 70% | 88% Alumina | 5 | — | 5 | 20 | 4.5 | 0.015 | 0.1 | 220 |
| 9 | Mullite 67% | 70% Alumina | 5 | 3 | 5 | 20 | 6 | 0.015 | 0.1 | 150 |
| 10 | Tabular Alumina 72% | 95% Alumina | — | 3 | 5 | 20 | 6 | 0.015 | 0.1 | 125 |
| 11 | SiC 70% | 70% SiC | 8 | 3 | 5 | 14 | 5.5 | 0.015 | 0.1 | 110 |
| 12 | Fused Silica 65% | 70% SiO$_2$ | 5 | — | 5 | 20 | 6.5 | 0.015 | 0.1 | 50 |
| 13 | Bauxite 70% | 88% Alumina | 5 | — | 5 | 20 | 4.5 | 0.015 | 0.1 | 220 |
| 14 | Mullite 67% | 70% Alumina | 5 | 3 | 5 | 20 | 6 | 0.015 | 0.1 | 150 |
| 15 | Tabular Alumina 72% | 95% Alumina | — | 3 | 5 | 20 | 6 | 0.015 | 0.1 | 125 |
| 16 | SiC 70% | 70% SiC | 8 | 3 | 5 | 14 | 5.5 | 0.015 | 0.1 | 110 |
| 17 | Fused Silica 65% | 70% SiO$_2$ | 5 | — | 5 | 20 | 6.5 | 0.015 | 0.1 | 50 |
| 18 | Bauxite 70% | 88% Alumina | 5 | — | 10 | 10 | 5.5 | 0.025 | 0.1 | 120 |
| 19 | Mullite 67% | 70% Alumina | 5 | 3 | 10 | 10 | 7 | 0.02 | 0.1 | 90 |
| 20 | Tabular Alumina 72% | 95% Alumina | — | 3 | 10 | 10 | 7 | 0.02 | 0.1 | 100 |
| 21 | SiC 70% | 70% SiC | 8 | 3 | 10 | 9 | 6.5 | 0.02 | 0.1 | 100 |
| 22 | Fused Silica 65% | 70% SiO$_2$ | 5 | — | 10 | 10 | 7.5 | 0.025 | 0.1 | 60 |
| 23 | Bauxite 70% | 88% Alumina | 6 | — | 12 | 12 | 5.5 | 0.025 | 0.1 | 90 |
| 24 | Mullite 67% | 70% Alumina | 5 | 3 | 12 | 13 | 7.5 | 0.03 | 0.1 | 100 |
| 25 | Tabular Alumina 72% | 95% Alumina | — | 3 | 12 | 18 | 7 | 0.025 | 0.1 | 90 |
| 26 | SiC 70% | 70% SiC | 8 | 3 | 12 | 7 | 6.5 | 0.025 | 0.1 | 100 |
| 27 | Fused Silica 65% | 70% SiO$_2$ | 5 | — | 12 | 13 | 8.5 | 0.025 | 0.1 | 50 |
| 28 | Bauxite 70% | 88% Alumina | 6 | — | 15 | 4 | 6 | 0.03 | 0.1 | 110 |
| 29 | Mullite 67% | 70% Alumina | 5 | 3 | 15 | 10 | 7.5 | 0.03 | 0.1 | 120 |
| 30 | Tabular Alumina 72% | 95% Alumina | — | 3 | 15 | 10 | 7.5 | 0.035 | 0.1 | 125 |

TABLE 1-continued

Exemplary formulations

| Example | Aggregate | Active | Fumed Silica | CaO Al₂O₃ Cement | Metaphosphate[1] | Calcined Alumina | H₂O | Sodium Silicate | PEG | Expected C.C.S (800° C.) |
|---|---|---|---|---|---|---|---|---|---|---|
| 31 | SiC 70% | 70% SiC | 8 | 3 | 15 | 10 | 7 | 0.03 | 0.1 | 120 |
| 32 | Fused Silica 65% | 70% SiO2 | 5 | — | 15 | 10 | 8 | 0.04 | 0.1 | 50 |

[1]Metaphosphate is either chromium metaphosphate binder or chromium-aluminum metaphosphate binder. Two separate compositions are made with either binder.
All values are expressed in weight percent Refractories are categorized based on the aggregate used and the chemical composition. The above table shows aggregate base minerals like "bauxite" or "mullite." Both minerals contain, for instance, a certain amount of alumina which is a criterion for the refractoriness of these minerals. Beside alumina as a mineral component from bauxite or mullite there is also additional alumina in the form of calcined alumina in the formulations to obtain flow characteristics and strengths—particularly hot-strengths. Fume silica is an additive that fills submicron pores and improves the flow characteristics and lowers the water content at the same time. It is almost 100% pure $SiO_2$.

Example 33

The slurries of each of Examples 3-32 are cast in a plaster mold and fired at 1500° F. The hot porosity and density results for the casting of the chromium-aluminum metaphosphate of Example 3 is provided in Table 2.

TABLE 2

Plaster molded refractory properties

| Porosity after 1500 F.: | ASTM C20 - 14% |
|---|---|
| Density after 1500 F.: | 185 lbs/ft³ |

The resulting material is used in plaster mold slip castings to form abrasion plates for use in coal fired burners or boiler tubes, launder segments, tap out blocks, ladle slide gates for steel forging, wear plates for ladles and in launders, and wear segments in metal-containing vessels for aluminum, copper, zinc, lead, cast iron, or other materials. After a piece of greenware is removed from the plaster mold, the greenware has sufficient strength to be amenable to additional machining prior to firing. Additionally, owing to the low water content compared to conventional plaster mold slip casting, shrinkage between a mold form and the fired article is minimal. Drying at 105° Celsius to volatilize water from the slurry prior to firing occurs.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

REFERENCE LIST

1.) U.S. Pat. No. 6,815,386: Use of phosphates to reduce slag penetration in Cr2O3-based refractories
2.) C. Powell Dogan et al: Improved Refractories for Slagging Gasifiers in IGCC Power Systems
3.) C. A. Zapffe: CONVERSION OF CERTAIN REFRACTORY OXIDES TO A SUBOXIDE FORM AT HIGH TEMPERATURES
4.) Biedenkopf et al: Vaporization and Corrosion of Refractories in the Presence of Pressurized Pulverized Coal Combustion Slag
5.) J. P. Benett: THE WEAR AND CORROSION OF HIGH CHROME OXIDE LININGS USED IN AIR-COOLED SLAGGING COAL GASIFIERS Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A refractory composition comprising:
   a plurality of aggregate particles;
   a binder intermixed with said plurality of aggregate particles, wherein sintered crystalline chromium metaphosphate, or sintered chromium-aluminum metaphosphate, or both, are distributed in said binder; and
   a nonfacile additive of calcium aluminate cement, sodium silicate, polyphosphate, an organic salt, or combinations thereof.

2. The composition of claim 1 wherein said composition does not include chromium oxide.

3. The composition of claim 1 wherein sintered crystalline chromium metaphosphate is distributed in said binder.

4. The composition of claim 1 wherein sintered crystalline chromium-aluminum metaphosphate is distributed in said binder.

5. The composition of claim 1 wherein said chromium metaphosphate, or chromium-aluminum metaphosphate is in the form of neutral dry particles.

6. The composition of claim 1 wherein said aggregate comprises alumina.

7. The composition of claim 1 wherein said plurality of aggregate particles comprises at least one of silicon carbide, fumed silica, mullite, or any combination thereof.

8. The composition of claim 1 further comprising one or more strengthening fibers.

9. A process of forming a refractory article comprising:
   forming a binder mixture of a chromium metaphosphate, chromium-aluminum metaphosphate, or both; and
   mixing said binder with an aggregate to form a slurry;
   wherein said refractory article is free of chromium oxide.

10. The process of claim 9 wherein said step of forming includes mixing chromium metaphosphate with alumina and heating to a temperature of 800° Celsius to 850° Celsius.

11. The process of claim 9 wherein said aggregate comprises alumina.

12. The process of claim 9 wherein said chromium metaphosphate is chromium-aluminum metaphosphate.

13. The process of claim 9 wherein said chromium metaphosphate is a crystalline neutral sintered material.

14. The process of claim 10 wherein said aggregate consists of alumina.

15. The process of claim 9 further comprising adding at least one additive of calcium aluminate cement, sodium silicate, or polyphosphate to said mixture.

16. The process of claim 9 further comprising heating the composition to induce sintering.

17. A refractory composition comprising:
a plurality of aggregate particles; and
a binder intermixed with said plurality of aggregate particles, wherein sintered crystalline chromium metaphosphate, or sintered chromium-aluminum metaphosphate, or both, is distributed in said binder;
said composition free of chromium oxide,
wherein said plurality of aggregate particles is selected from the group consisting of silicon carbide, fumed silica, alumina, mullite, bauxite, or combinations thereof;
the composition further comprising a nonfacile additive of calcium aluminate cement, sodium silicate, polyphosphate, an organic salt, or combinations thereof.

18. The refractory composition of claim 17 further comprising one or more strengthening fibers selected from the group consisting of stainless steel fibers, steel, other metal fibers, and carbon fibers.

* * * * *